United States Patent [19]

Hoffman et al.

[11] Patent Number: 5,371,487
[45] Date of Patent: Dec. 6, 1994

[54] METHOD AND APPARATUS FOR INDICATING A CHANGED CONDITION

[75] Inventors: John P. Hoffman, Peoria; Ricky D. Vance, Washington; Dennis A. Barney, Morton, all of Ill.

[73] Assignee: Caterpillar Inc., Peoria, Ill.

[21] Appl. No.: 150,340

[22] Filed: Nov. 10, 1993

Related U.S. Application Data

[63] Continuation of Ser. No. 945,472, Sep. 16, 1992, abandoned.

[51] Int. Cl.⁵ .............................................. B60Q 1/00
[52] U.S. Cl. .............................. 340/425.5; 340/438; 340/459; 340/461; 340/525; 364/141; 364/424.03
[58] Field of Search ............ 340/425.5, 438, 459, 340/461, 462, 525; 364/424.03, 424.06, 550, 141

[56] References Cited

U.S. PATENT DOCUMENTS

| | | | |
|---|---|---|---|
| 3,516,063 | 6/1970 | Arkin et al. | 340/505 |
| 3,866,166 | 2/1975 | Kerscher, III et al. | 340/52 F |
| 4,053,868 | 10/1977 | Cox et al. | 340/52 F |
| 4,072,925 | 2/1978 | Yashima et al. | 340/52 F |
| 4,128,005 | 12/1978 | Arnston et al. | 73/117.3 |
| 4,223,302 | 9/1980 | Hocking | 340/525 |
| 4,271,402 | 6/1981 | Kastura et al. | 340/52 F |
| 4,376,298 | 3/1983 | Sokol et al. | 364/551 |
| 4,497,057 | 1/1985 | Kato et al. | 371/29 |
| 4,521,885 | 6/1985 | Melocik et al. | 371/29 |
| 4,583,176 | 4/1986 | Yamato et al. | 364/431.11 |
| 4,667,176 | 5/1987 | Matsuda | 340/52 F |
| 4,694,408 | 9/1987 | Zaleski | 364/551 |
| 4,748,843 | 6/1988 | Schafer et al. | 73/117.3 |
| 4,809,177 | 2/1989 | Windle et al. | 364/424.01 |
| 4,843,557 | 6/1989 | Ina et al. | 364/431.77 |
| 4,896,276 | 1/1990 | Saglimbeni et al. | 364/550 |
| 4,967,143 | 10/1990 | Raviglione et al. | 324/73.1 |
| 4,975,848 | 12/1990 | Abe et al. | 364/424.03 |
| 4,977,389 | 12/1990 | Shiraishi | 340/461 |
| 5,019,799 | 5/1991 | Oshiage et al. | 340/438 |
| 5,034,889 | 7/1991 | Abe | 364/424.04 |
| 5,041,980 | 8/1991 | Maddock et al. | 364/431.03 |
| 5,050,080 | 9/1991 | Abe | 364/424.04 |
| 5,091,858 | 2/1992 | Paielli | 364/431.12 |
| 5,150,609 | 9/1992 | Ebner et al. | 73/117.3 |
| 5,157,610 | 10/1992 | Asano et al. | 364/424.03 |
| 5,214,582 | 5/1993 | Gray | 364/424.03 |
| 5,257,190 | 10/1993 | Crane | 364/424.03 |

FOREIGN PATENT DOCUMENTS

WO92/04693 3/1992 WIPO .

OTHER PUBLICATIONS

Caterpillar Service Manual—"Computerized Monitoring System with LCD Bargraph Gauges", published Jan. 1991.

Journal Article—"Microelectronics takes to the road in a big way: a special report", pp. 113–122 in the Nov. 20, 1980 edition of Electronics.

Journal Article—"Expert-systems applied to earth-moving vehicle transmission troubleshooting", pp. 38–40 published in the Dec. 1990 edition of Automotive Engineer.

Publication entitled "Introducing the Vital Signs Monitor plus Load Weighing System", by Marathon LeTrouneau, published on or about Jan. 1988.

Journal Article—"All on board with O & K" believed to have been published on or about Jan. 1990, and sales literature attached thereto.

*Primary Examiner*—Donnie L. Orosland
*Attorney, Agent, or Firm*—Steven R. Janda

[57] ABSTRACT

Systems for diagnosing fault conditions in a plurality of inputs are useful in many applications. Advantageously, such systems allow troubleshooting by a single technician. The subject invention includes a plurality of sensors for producing sensor signals, each of the sensor signals indicating one of plurality of states of a parameter. A device is included to indicate that one or more of the sensor signals has changed states.

44 Claims, 5 Drawing Sheets

Fig_1

METHOD AND APPARATUS FOR INDICATING A CHANGED CONDITION

This is a continuation of application Ser. No. 07/945,472, filed Sep. 16, 1992, now abandoned.

TECHNICAL FIELD

This invention relates generally to diagnosing fault conditions on a plurality of inputs and, more particularly, to a method and apparatus for indicating that one of the inputs has changed states.

BACKGROUND ART

Today's machines, and particularly large off-highway work vehicles, are becoming increasingly complex in their design thus making it more and more difficult for service personnel to locate defects in machine sensors and systems. This is particularly true of intermittent defects not resulting in a breakdown of a system or the vehicle but which interfere with its operation.

A major frustration when troubleshooting electrical problems on a large work vehicle is the intermittent problems. Typically, the operator reports some symptom to a technician and before the technician can get to the machine the problem is no longer present.

If the condition is not present it is helpful for the technician to re-create the fault condition. In many cases the fault condition is caused by a short to ground potential or an open circuit. To recreate these fault conditions, the technician manipulates the wire harnesses or wire connectors to determine the point at which the fault has occurred.

Prior art systems have indicated when fault conditions are present. In connection with such systems, the technician must view a visual display to determine whether the condition is present. In troubleshooting intermittent problems when the fault condition is not currently present, the technician must manipulate wire harnesses and connectors recreate the fault and thus cause the fault indication to displayed. When the fault condition is present, the technician must manipulate wire harnesses and connectors and observe whether the manipulations eliminate the fault and thus cause the fault indication to disappear.

In many cases, however, the machine is of sufficient size that the technician must leave the area of the diagnostic tool to recreate the fault condition. Therefore, any visual indicator provided by the diagnostic tool is not visible to the technician. To effectively troubleshoot the electrical system on such a large machine, typically two or more technicians are required and repair expenses are thus greatly increased. Similarly, the vehicle may not be repairable immediately if only a single technician is available.

The present invention is directed at overcoming one or more of the problems as set forth above.

DISCLOSURE OF THE INVENTION

The invention avoids the disadvantages of known diagnostic systems and provides an instrument that is useful in connection with large machines having one or more fault conditions.

In one aspect of the invention, an apparatus for indicating a changed condition in a diagnostic system is provided. The apparatus includes a plurality of sensors for producing sensor signals, each of the sensor signals indicating one of a plurality of states of a parameter. A device is included to indicate that one or more of the sensor signals has changed states.

In another aspect of the invention, a method for indicating a changed condition in a diagnostic system is provided. The method includes the steps of sensing a plurality of parameters and responsively producing sensor signals, each of the sensor signals indicating one of a plurality of states; and indicating that one or more of the sensor signals has changed states.

The invention also includes other features and advantages which will become apparent from a more detailed study of the drawings, specification, and appended claims.

BRIEF DESCRIPTION OF THE DRAWINGS

For a better understanding of the present invention, reference may be made to the accompanying drawings in which.

BEST MODE FOR CARRYING OUT THE INVENTION

Figure 1:
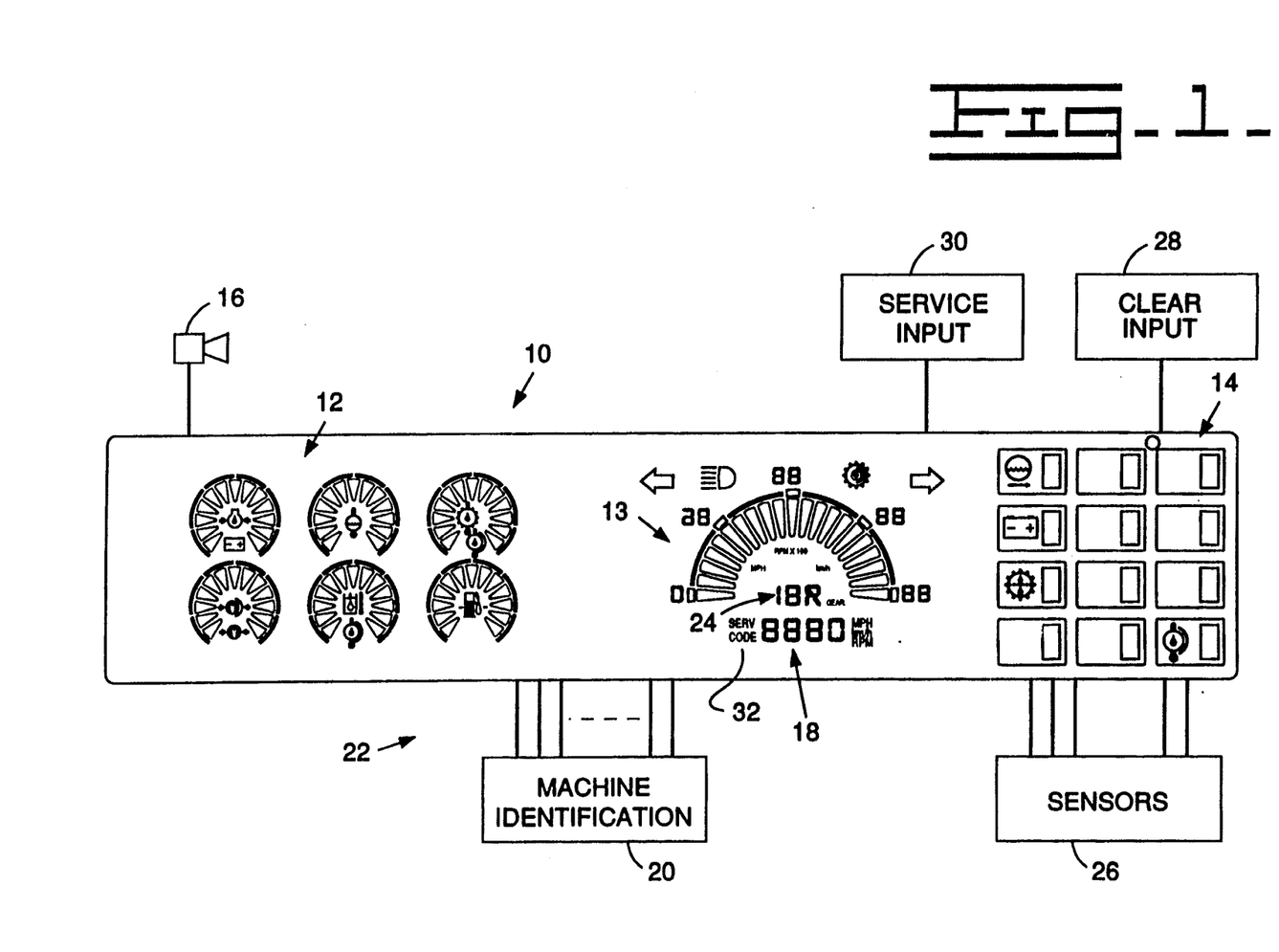
FIG. 1 illustrates a computerized monitoring and diagnostic system.

An instrument for displaying parameter values is shown generally by the reference numeral 10 in FIG. 1. In the preferred embodiment, the instrument 10 is a computerized diagnostic and monitoring system for monitoring and displaying parameters and informing an operator by visible and/or audible indications when a warning condition exists, The instrument 10 is advantageously microprocessor based and functions in response to internal software. The instrument 10 includes a plurality of indicator lights 14, preferably LEDs, and a plurality of electronic gauges 12 having a plurality of illuminable segments, preferably of the vacuum fluorescent (VF) type. Advantageously, the instrument 10 is used in connection with a large work vehicle and is fixedly located in the operator's compartment such that an operator can view the parameter levels and any warning indication produced by the instrument 10.

The gauges 12 indicate the level of a plurality of sensed parameters, for example, ground speed, engine RPM, oil temperature, fuel level, transmission oil temperature, and the like, and may be used in connection with any of a plurality of different machine types. In the preferred embodiment, one of the gauges 12 is a speedo/tacho gauge 13 that displays either the speed of the vehicle or the RPM of the engine or transmission and includes scaling digits for displaying the magnitude of the sensed parameter at various points along the speedo/tacho gauge 13. Since the desired scaling digits may be different for each machine, the instrument 10 modifies the scaling digits in response to the machine to which the instrument 10 is connected.

Each gauge, except the central gauge indicating speedo/tacho information, is capable of indicating either a high warning condition or a low warning condition, i.e., sensed parameters being above or below a normal operating range.

Warning conditions are brought to the operator's attention by the indicator lights 14, a flashing gauge, a flashing alarm lamp, and/or a warning horn 16. Advantageously, the indicator lights 14 are illuminated in response to switch-type inputs being in a fault or warning condition which is advantageously defined as being at an open voltage condition. If an input normally associated with a switch-type input is unused on the machine to which the instrument is connected, the indicator light 14 is not illuminated and otherwise does not indicate a fault condition.

When used in connection with some machines, it is also desirable for the instrument 10 to include turn signal indicators, a hi-beam light indicator, and a retarder indicator for informing the operator that a transmission retarder is engaged, for example, on a large off-highway work vehicle. However, not all machines use all functional indicators. Thus the instrument 10 controllably enables each of the functional indicators needed by the machine to which the instrument 10 is connected. As is the case with the gauges, the functional indicators are also of VF design.

A VF digital display 18 is included to indicate either speedometer or tachometer information in digital form. In the preferred embodiment, one of the speedo/tacho gauge 13 and digital display 18 indicates speedometer information while the other indicates tachometer information; however, either speedometer or tachometer information may be indicated on both if so desired. Advantageously, the digital display 18 is also adapted to indicate the level of other parameters when the instrument 10 is operating in a numeric readout mode or diagnostic information when the instrument 10 is operating in diagnostic modes.

Advantageously, each machine type has an identification code to be delivered to the instrument 10 which responsively reconfigures itself to conform to the format chosen by the designer for that machine. In response to the identification code, the instrument 10 determines the parameter monitored at each input from the wire harness, the functional indicators to be illuminated, the type of display brightness control to be used, the parameter to be displayed on each gauge, the status report level for each input, the gauges to be used, the data to be transmitted over the communication link to another electronic control, the signal filtering, debounce, scaling, or averaging characteristics associated with each input, and the functional relationship between each parameter value and the gauge reading. Likewise, the switch-type input associated with each indicator light 14 is defined for each machine type on which the instrument 10 is used in response to the identification code.

An identification means 20 produces the identification code. In the preferred embodiment, the identification means 20 is connected to the instrument 10 via one or more identification lines 22 forming part of the wire harness and carrying the identification code.

In the preferred embodiment, the identification code is in the form of binary signals produced by connecting each of the identification lines 22 to a ground input potential or allowing the voltage of the identification line to float in response to any voltage to which the identification line 22 is connected. In the preferred embodiment, the identification means 20 directly connects the identification lines 22 to a terminal having one of the above described voltage characteristics; however, it should be appreciated that the identification lines 22 could be connected to a switch-type device for connection to a ground input potential or a floating terminal.

While the preferred embodiment of the invention is described in connection with a ground input potential and a floating or open voltage condition, it should be appreciated that the particular states of the binary signals could be modified without deviating from the spirit of the invention.

In general, the machine dependent functions and displays described herein are determined in response to the identification code, although other inputs may be used to determine such things as whether the gauges 12 will display in a fill-the-graph or a single-bar mode and whether speed will be displayed in MPH or km/h. Typically, the instrument 10 retrieves a number of identifiers from a memory device (not shown) within the instrument 10 in response to receiving the identification code. The instrument 10 uses the identifiers to determine which functions and displays are to be used in connection with machines having the received identification code.

In addition to the above warning indications, the warning horn 16 or the alarm lamp may be activated when the level of the sensed parameter exceeds a high or low warning value.

A gear display 24 is disposed adjacent the digital display 18 and advantageously indicates the number and direction, i.e. forward, neutral, or reverse, of a vehicle transmission.

The instrument 10 is connected to each of a plurality of sensors 26 by wire. The instrument 10 preferably performs some processing of signals received from the sensors over the wire harness and scales the signals received from pulse-width modulated type sensors and frequency based sensors in manners well-known in the art. Similarly, the instrument 10 receives signals from switch-type sensors. The signals associated with these inputs are received by the instrument 10, but generally no scaling is required.

In the preferred embodiment, the instrument 10 includes a plurality of operating modes for use in normal operation and as a diagnostic tool. The operating modes preferably include a normal display mode, a service mode, a status mode, a tattletale mode, and a numeric display mode. While in a normal display mode, the instrument 10 displays sensed parameter levels and indicates warning conditions in response to sensed parameters being outside a given range.

The instrument 10 preferably includes terminals for receiving signals from a clear input 28 and a service input 30. A service tool is advantageously included having two single-pole, single-throw (SPST) switches corresponding to the clear input 28 and service input 30. The technician actuates the switches to selectively ground the clear input 28 and service input 30. The service and clear inputs 28,30 are advantageously used by the technician to select the mode of operation for the instrument 10 and to provide commands to the instrument 10 when operating in one or more of the modes of operation. It should be understood, however, that many other devices may be used to select a desired operating mode.

The instrument 10 automatically enters the normal display mode of operation when power is applied. To access other display modes, the service and clear inputs 28,30 are grounded simultaneously. When both inputs 28,30 are grounded, a mode number corresponding to the current operating mode appears on the digital display 18. Preferably, the five operating modes are numbered from 0 through 4. If the service and clear inputs 28,30 both remain grounded for advantageously 2 seconds, the instrument 10 begins scrolling through the modes. When the desired mode is reached, i.e. the mode number corresponding to the desired operating mode is displayed on the digital display 18, the technician locks on to that mode by disconnecting the service and clear inputs 28,30 from ground.

Vital vehicle functions are monitored and reported on the instrument display panel in the normal display mode. The instrument 10 monitors itself and the I/O circuits for status, for intermittent-fault conditions, and for currently-present fault conditions. The instrument 10 monitors both diagnosable inputs, i.e. those inputs that can be detected as being outside a valid range, and switch-type, non-diagnosable inputs. The instrument 10 also retains fault information relating to fault conditions on diagnosable inputs in non-volatile memory (not shown) within the instrument 10. Thus, the memory device (not shown) includes indications of each fault condition relating to a diagnosable input that has existed on the machine whether or not the fault condition is currently present. However, fault conditions on switch-type inputs are only indicated when present. Advantageously, the service and clear inputs 28,30 may be used to clear the stored fault information in one or more of the diagnostic modes.

If any fault conditions are sensed on the diagnosable inputs while in the normal display mode, either from the instrument 10 or from other system modules, a SERV CODE indicator 32 located adjacent the digital display 18 is illuminated. The SERV CODE indicator 32 is advantageously illuminated to report a detected condition regardless of the present status of the inputs, i.e., whether or not any input is presently in a fault condition. In this way, the operator and/or technician are informed that a fault condition has existed on the machine in the past even though none are currently present.

While in the service mode, the instrument 10 identifies and diagnoses fault conditions in diagnosable inputs, i.e. those inputs that can be detected as being outside a valid range. In the preferred embodiment, the sensors 26 diagnosed in the service mode are frequency based sensors or pulse-width modulated sensors having a duty cycle being indicative of the level of the sensed parameter. Predefined maximum and minimum frequencies or duty cycles define the valid range. If the sensor signal is outside the valid range, the instrument 10 recognizes the condition as a fault. The service mode also is used advantageously to determine whether certain circuits are shorted to ground, for example a warning horn circuit. If an input is unused on the machine to which the instrument 10 is connected, the instrument 10 ignores the unused input and does not indicate a fault condition.

The instrument 10 displays information relating to fault conditions stored in memory. Fault conditions are preferably identified by fault codes including a Module Identifier (MID), a Failure Mode Identifier (FMI), and a Component Identifier (CID). Advantageously, the MID, FMI, and CID are displayed on the instrument 10 by illuminable displays also used in connection with the instrument 10 operating in the normal display mode.

The Module Identifier indicates which module diagnosed the fault condition. The MID appears on the middle digits at the top center of the speedo/tacho gauge 13.

The Component Identifier indicates the component which has failed. The CID is advantageously displayed as 3 digits on the digital display 18.

The Failure Mode Identifier indicates the nature of the fault condition. The FMI advantageously appears as a 1 or 2 digit number on the gear display 24 and is followed by the letter F. If there are no fault codes available, the CID and FMI appear as ". . . " and "-F" respectively.

While in the service mode, system fault codes are viewed and/or cleared individually. Upon entering the service mode, the fault codes identifying the first available fault condition are displayed. To view the fault codes identifying the remaining fault conditions, the service input 30 is grounded. With the service input 30 grounded, the instrument scrolls through all available fault conditions. Any fault condition that is currently present is identified by the SERV CODE indicator 32 being illuminated. When the fault is not present, the SERV CODE indicator is not illuminated.

When the service input 30 is disconnected from ground, the instrument 10 "locks" onto the fault condition associated with the currently-displayed fault codes. To clear a particular fault condition once it has been "locked", the clear input 28 is grounded. When a fault condition has been cleared, the fault codes associated with the next available fault condition appear as soon as the clear input 28 is disconnected from ground. By grounding and ungrounding the clear input with the service input ungrounded, all fault codes are cleared one at a time. Fault codes are saved by grounding the service input and scrolling past fault codes without clearing them. When all fault codes have been cleared, the display remains blank for 3 seconds, then the CID and FMI appears as ". . . " and "-F-", respectively.

A pin number is assigned to each of the inputs to the instrument 10. If the fault condition that has been "locked upon" represents a condition related to the instrument 10, the pin number associated with that condition is shown on the 2 digits normally used to display the full-scale units for the speedo/tacho gauge 13.

Pin numbers are also shown for change-of-state conditions, i.e. a change from being within the valid range to being outside the valid range or vice versa. The pin numbers monitored for this feature include all diagnosable conditions: not just the fault condition upon which the instrument 10 is "locked." Thus, for example, even though "locked upon" a transmission temperature diagnostic, if while inspecting or disturbing the harness, the transmission temperature and the fuel level and the brake air pressure all changed state, the connector pin numbers associated with each of these parameters are scrolled. The place where the pin number(s) for change-of-state conditions are shown is the 2 digits normally used to display the three-fourths-of-full-scale units for the speedo/tacho gauge 13.

As stated earlier, in the service mode the SERV CODE indicator 32 is illuminated for present faults and turned off otherwise. When the instrument 10 is locked on a particular fault condition, the SERV CODE indicator 32 is aided by the warning horn 16. The horn 16 sounds briefly each time the SERV CODE indicator 32 changes state. Note that the warning horn 16 sounds only for changes in the "locked" condition while in the service mode. If there is a change-of-state of any of the other diagnosed conditions within service mode, the warning horn 16 does not sound.

When, for instance, the instrument is "locked" on a particular diagnostic code, service personnel may watch the SERV CODE indicator 32 while manipulating the wire harness or disturbing a connector or plugging/unplugging a sensor to help determine the location or cause of an intermittent problem. In this example, typically two people are needed to make the procedure efficient since the wire harness and connectors to be manipulated are often located remotely from the instrument 10. To help one person be an effective troubleshooter, the warning horn 16 is used as a special audible version of the SERV CODE indicator 32 since the warning horn 16 sounds briefly each time the SERV CODE indicator 32 changes state.

Figure 2:
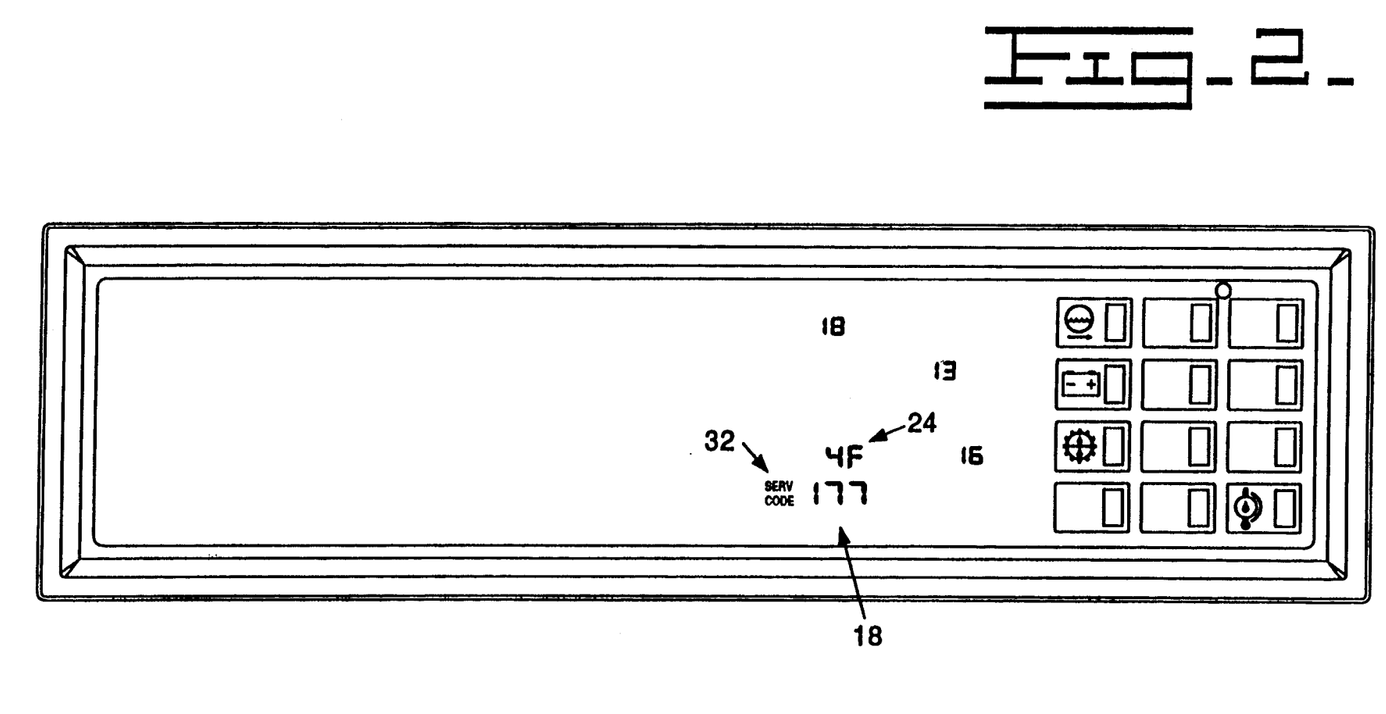
FIG. 2 illustrates the computerized monitoring and diagnostic system functioning in a service mode.

FIG. 2 illustrates the instrument 10 in service mode. The pin numbers are shown for the locked condition and for the change-of-state condition. As noted above, pin numbers are shown only when locked on a particular code. When leaving a locked-code state, that is advancing to another fault condition or leaving the service mode, all pin number information is erased from memory and is no longer displayed.

Figure 3:
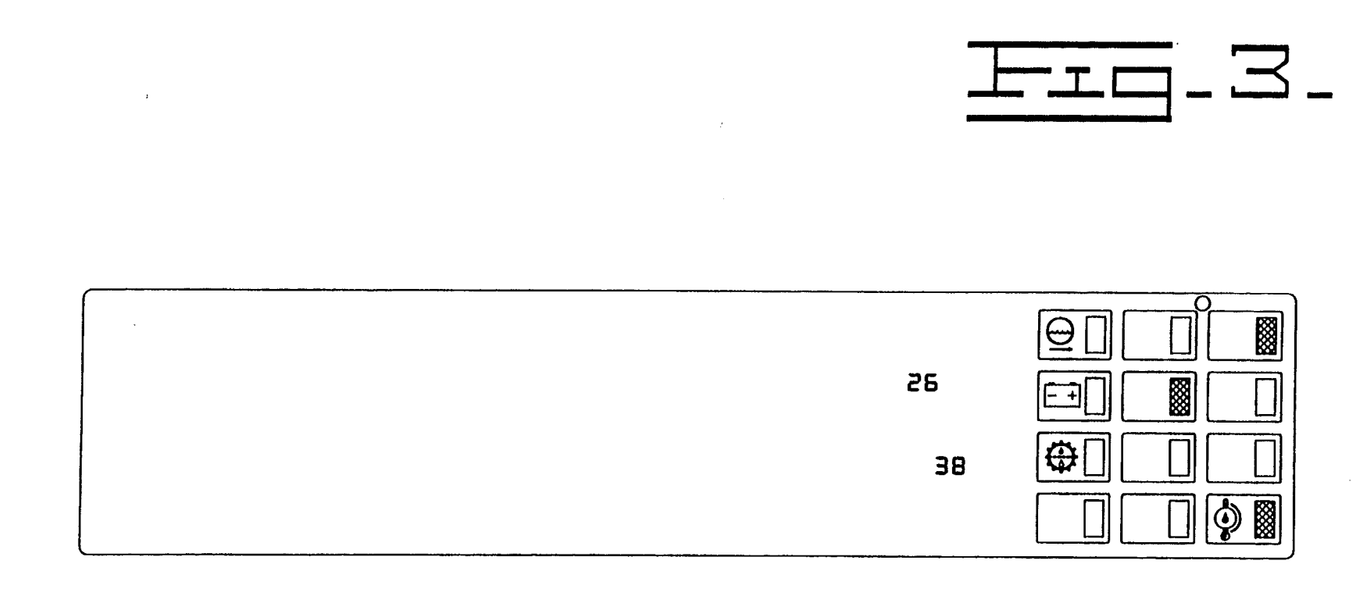
FIG. 3 illustrates the computerized monitoring and diagnostic system functioning in a status mode.

Referring now primarily to FIG. 3, the status mode is preferably used to identify fault or warning conditions in switch-type inputs that are not easily diagnosed and are generally used in connection with the indicator lights 14. The switch-type inputs advantageously include switch inputs, vehicle identification codes, and various other inputs having a limited number of possible states and indicate one of a normal state and a fault condition. Advantageously, the fault condition corresponds to an open or floating voltage condition.

Some of the inputs are used to program the instrument 10 to perform certain functions and may be either at ground potential or an open or floating voltage condition and are thus treated as switch-type inputs in the status mode. For the purposes of discussion, the term fault condition with respect to the switch-type inputs is used generically to refer to an open voltage condition. However, it should be appreciated that other voltage conditions or electrical signals could be defined as corresponding to the fault condition without deviating from the invention. Thus, the programming switch-type inputs are referred to as being in the fault condition when in the open voltage condition even though it may in fact be desirable for that programming input to be at the open voltage condition. Similarly, when a switch-type sensor produces an open voltage condition on one of the switch-type inputs in response to the sensed parameter being outside a normal operating range, the switch-type input is also referred to as being in a fault condition.

The indicator light 14 function while in the status mode is advantageously defined such that an indicator light 14 is flashed when the associated input is in an open voltage condition and is turned off when the associated input is at ground potential. In the preferred embodiment, there are more switch-type inputs to be indicated in the status mode than the number of available indicator lights 14. To indicate all of the desired inputs, the clear input 28 is used to toggle between two sets of inputs. Thus when the clear input 28 is grounded, one set of inputs is displayed on the indicator lights 14 and when the clear input 28 is open, the other set of inputs is displayed.

Pin number(s) of monitored conditions presently in a fault condition are shown/scrolled on the 2 digits normally used to show the full-scale units for the speedo/tacho gauge 13. When the pin number is shown for a parameter presently displayed by an indicator light 14, that indicator light is steadily illuminated rather than flashed. If the condition changes, i.e. the parameter goes to a non-fault condition, the indicator light 14 turns off and the pin number is no longer displayed as being in a fault condition.

Pin number(s) are also displayed for a status change of any of the parameters monitored in the status mode, e.g., a change from open to ground or ground to open. In the case of multiple changes, the pin numbers are scrolled. These pin numbers are displayed on the 2 digits normally used to display the three-fourths-of-full scale units for the speedo/tacho gauge 13. The pin number information relating to inputs having changed status is erased from memory in response to leaving the status mode by simultaneously grounding the service and clear inputs 28,30.

The warning horn 16 is used in the status mode to augment the usefulness of the indicator lights. The warning horn 16 sounds briefly each time one of the switch-type inputs changes state. The sounding of the warning horn 16 occurs for any of the parameters available in status mode. The augmentation added by the warning horn 16 makes it possible for the technician to determine when a change-of-state has occurred even when working remotely from the instrument 10 which is advantageously fixedly located in the operator's station of a vehicle.

Figure 4A:
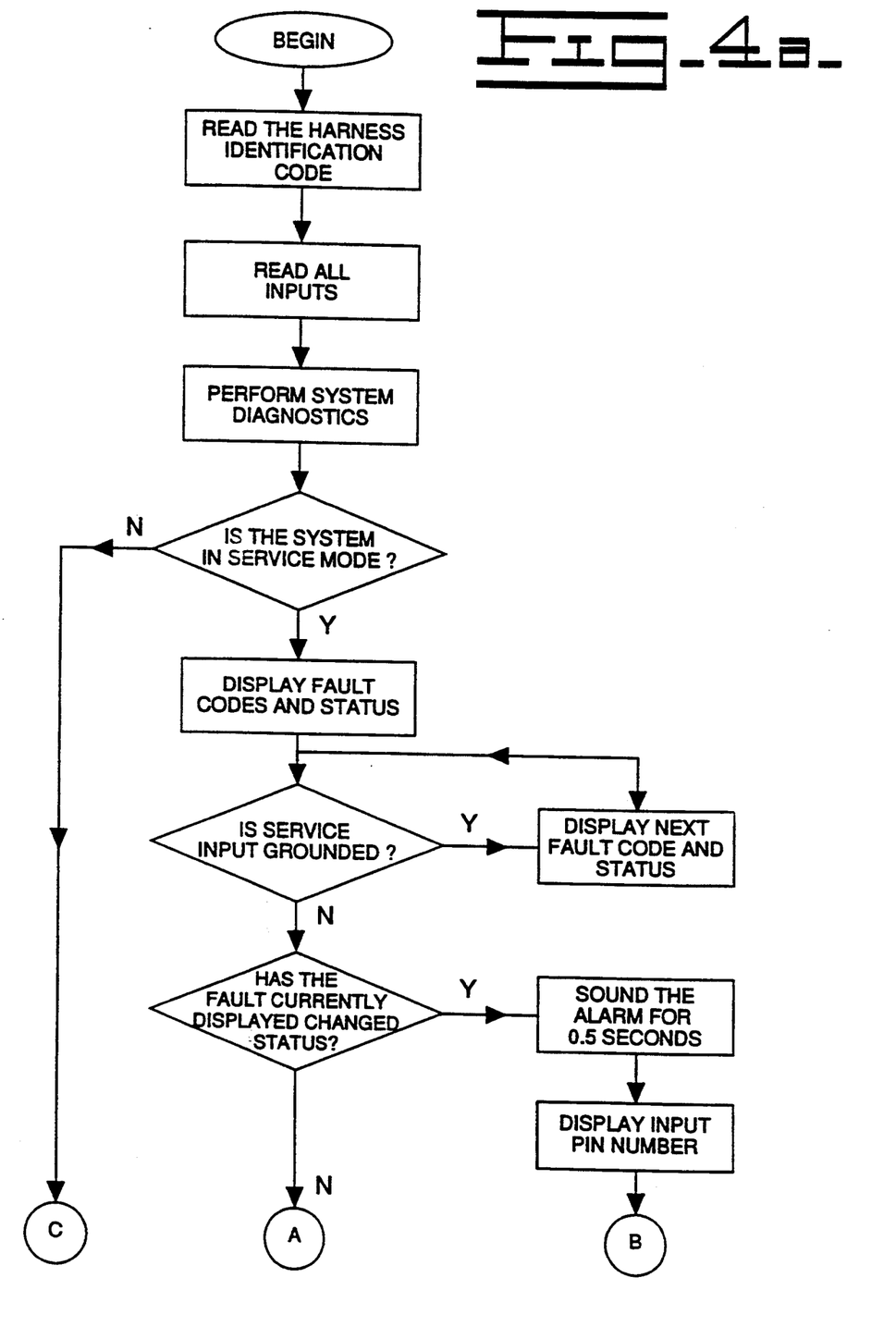
FIGS. 4a and 4b illustrate a flow chart of an algorithm executed in connection with a preferred embodiment of the invention.
Figure 4B:
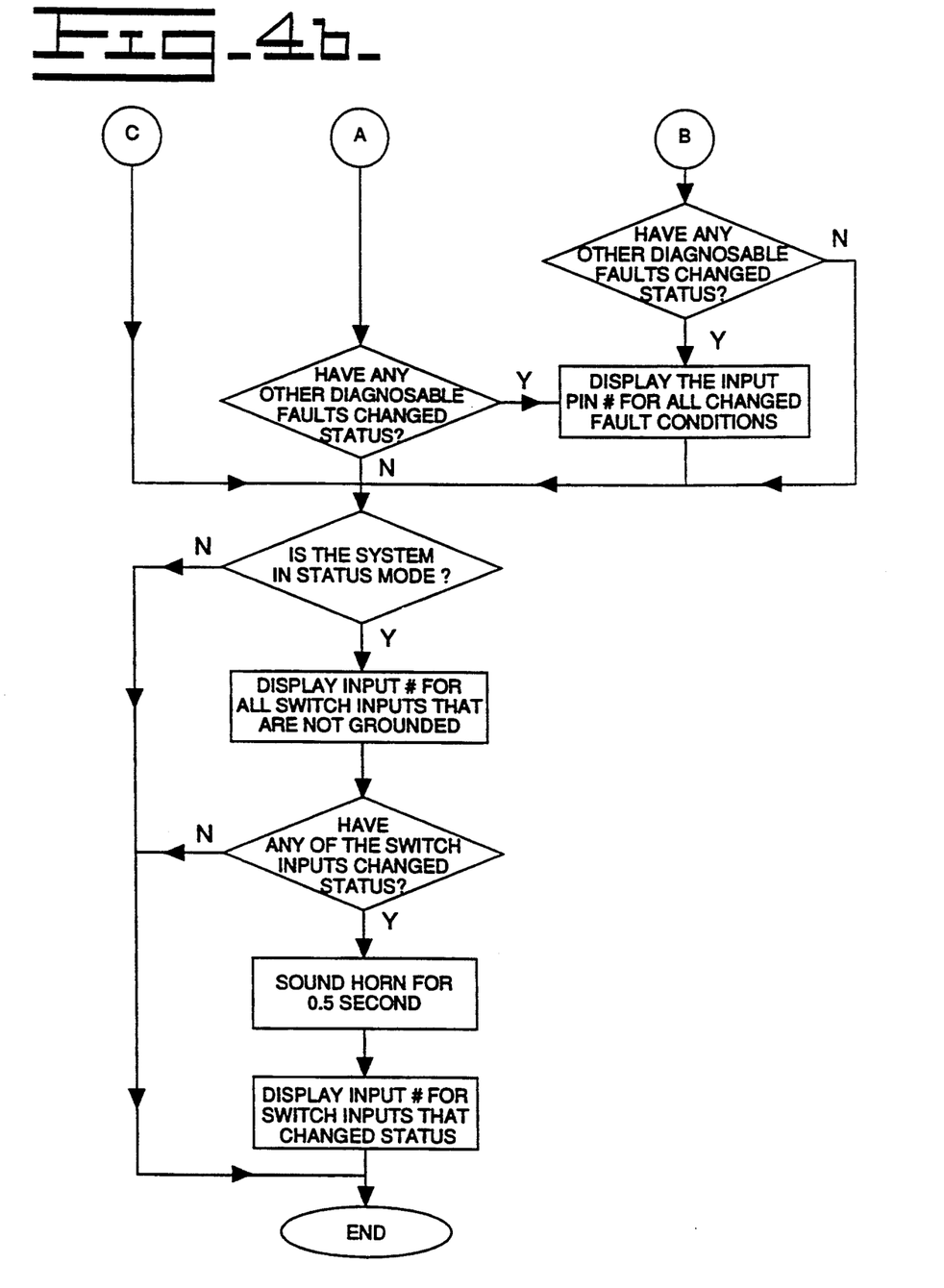

Referring now to FIGS. 4a and 4b, a flow chart of an algorithm executed by the instrument 10 in a preferred embodiment of the invention is shown. The instrument 10 reads the identification code and responsively retrieves a number of identifiers from a memory device (not shown) within the instrument 10. The identifiers are defined such that the microprocessor (not shown) within the instrument 10 determines, for that particular machine, the parameter monitored at each input from the wire harness, the parameter to be displayed on each gauge, the status report level for each input, the signal filtering, debounce, scaling, or averaging characteristics associated with each input, and the switch-type input associated with each indicator light 14. The instrument 10 reads all of the inputs being used in connection with the machine to which it is connected and performs the system diagnostics on those inputs as described above.

If the instrument 10 is in the service mode, the instrument 10 produces a plurality of control signals causing a plurality of fault codes to be displayed with respect to one of the stored fault conditions which may or may not be currently present. The MID associated with the fault condition is displayed on the middle scaling digits at the top center of the speedo/tacho gauge 13. Similarly, the instrument 10 produces control signals to cause the CID associated with the fault condition to be displayed as 3 digits on the digital display 18, the FMI associated with the fault condition to appear as a 1 or 2 digit number on the gear display 24 and is followed by the letter F, and the SERV CODE indicator 32 to be illuminated if the fault condition is currently present. The instrument 10 also produces a control signal to indicate the pin number of the sensor signal for which the fault codes are displayed. Preferably, the pin number is displayed on the 2 digits normally used to display the full-scale units for the speedo/tacho gauge 13.

If the service input 30 is grounded, the instrument 10 causes the fault codes and associated pin number for each of the stored fault conditions to be scrolled on the available displays such that each is displayed for a predefined period of time before being replaced by the fault code and associated pin number of another stored fault condition, and so forth. Once all of the stored fault conditions have been displayed, the sequence is repeated.

If the technician disconnects the service input 30 from ground potential, the fault codes and associated pin number are "locked onto" and the instrument 10 responsively stores the present status of each of the diagnosable sensor inputs in memory. That is, the memory device (not shown) includes an identifier for each of the diagnosable sensor signals indicating whether it is in a fault condition or a normal state at the time the service input 30 is removed from ground potential.

The instrument 10 compares the current status of the locked input to the status stored in memory for that input. If the currently displayed fault condition has changed status, then the instrument 10 stores the new status of that input in place of the previous status and produces a control signal causing the warning horn 16 to produce an audible signal for advantageously 0.5 seconds. The instrument also produces a command to cause the pin number of that input to be displayed on the 2 digits normally used to display the three-fourths-of-full-scale units for the speedo/tacho gauge 13.

Regardless of whether the currently displayed fault condition has changed status, the instrument 10 determines whether any other diagnosable sensor inputs have changed status in a similar manner by comparing the current status of each diagnosable sensor input to the status stored in memory for that input. If one or more of the inputs have changed status, then the new input status of each of the changed inputs is stored in memory in place of the earlier status and the instrument 10 produces a control signal causing the pin number for each input that has changed status to be displayed on the 2 digits normally used to display the three-fourths-of-full-scale units for the speedo/tacho gauge 13. If there is more than one input that has changed status, the instrument 10 causes the pin numbers to scroll by alternatively producing commands to display each of the pin numbers.

If the instrument 10 is in the status mode, the instrument 10 stores the status, i.e., grounded or open voltage condition, in memory for each of the switch-type inputs. In response to one of the switch-type inputs being in an open voltage condition, the instrument 10 produces a command causing the 2 digits normally used to display the full-scale units for the speedo/tacho gauge 13 to indicate the pin number associated with that switch-type input. If more than one switch-type input is in an open voltage condition, the instrument 10 causes the pin numbers to scroll by alternatively producing commands to display each of the pin numbers. In addition, the indicator light 14 associated with the pin number presently being displayed is steadily illuminated by the instrument 10. All other indicator lights 14 corresponding to sensor signals presently in a fault condition are flashed by the instrument 10.

The instrument 10 also determines whether any of the switch-type inputs have changed status by comparing the current status of each of the switch-type inputs to the status stored in memory for that input. If any of the switch type inputs have changed status, the instrument 10 stores the new status in memory, produces a control signal causing the warning horn 16 to produce an audible signal for advantageously 0.5 seconds, and produces a command causing the 2 digits normally used to display the three-fourths-of-full-scale units for the speedo/tacho gauge 13 to indicate the pin number associated with the changed input. If more than one switch-type input has changed status, the instrument 10 causes the pin numbers to scroll by alternatively producing commands to display each of the pin numbers.

Within each of the service and status modes, the function of determining whether each of the inputs have changed status is repeated at predefined intervals. Advantageously, the interval is selected to be sufficiently short that substantially any intermittent change of status caused by manipulations of the wire harness or connectors by the technician is detected.

Industrial Applicability

The operation of a preferred embodiment of the present invention is best described in connection with a computerized monitoring and diagnostic system. In the preferred embodiment, the instrument 10 includes a plurality of operating modes for use in displaying parameter values and as a diagnostic tool. The operating modes preferably include a normal display mode, a service mode, a status mode, a tattletale mode, and a numeric display mode.

The instrument 10 preferably includes terminals for receiving signals from a clear input 28 and a service input 30. The service and clear inputs 28,30 are used to select the mode of operation for the instrument 10 and to provide commands to the instrument 10 when operating in one or more of the modes of operation.

The instrument 10 automatically enters the normal display mode when power is applied. To access other display modes, the technician grounds the service and clear inputs 28,30 simultaneously. When both inputs 28,30 are grounded, a mode number corresponding to the current operating mode appears on the digital display 18. If both inputs remain grounded for advantageously 2 seconds, the instrument 10 begins sequencing through the modes. When the desired mode is reached, i.e. the mode number corresponding to the desired operating mode is displayed on the digital display 18, the technician "locks" onto that mode by disconnecting the service and clear inputs 28,30 from ground.

The SERV CODE indicator 32 is illuminated in the service mode only when the "locked on" input presently is in a fault condition. When the instrument 10 is "locked on" a particular diagnostic code, the technician views the SERV CODE indicator 32 while manipulating the wire harness or disturbing a connector or plugging/unplugging a sensor to help determine the location or cause of an intermittent problem. Each of the pin numbers associated with a changed state on one of the instrument 10 terminals is also displayed. To aid troubleshooting by one technician, the warning horn 16 supplements the SERV CODE indicator 32 by producing an audible signal each time the SERV CODE indicator 32 changes state.

When in the status mode, the indicator lights 14 are used diagnostically to indicate the status of various inputs. The warning horn 16 augments the usefulness of the indicator lights 14 by sounding briefly each time any of the switch-type inputs changes states. The augmentation allows the technician to determine when a switch-type input has changed state even when working remotely from the instrument 10. The pin numbers of switch-type inputs having changed status are also displayed to provide the technician with a visual indication of which inputs have changed state.

Any specific values used in the above descriptions should be viewed as exemplary only and not as limitations. Other aspects, objects, and advantages of this invention can be obtained from a study of the drawings, the disclosure, and the appended claims.

We claim:

1. An apparatus for indicating a changed condition in a diagnostic system, comprising:
   a plurality of sensor means for sensing a plurality of parameters and responsively producing a plurality of sensor signals, each of said sensor signals being in one of a normal state or a fault condition; and
   processing means for receiving each of said plurality of sensor signals and responsively determining whether one or more of said plurality of sensor signals have changed from said normal state to said fault condition or from said fault condition to said normal state, said processing means including means for producing a transient signal and a recorded diagnostic signal in response to one or more of said sensor signals changing from said normal state to said fault condition or from said fault condition to said normal state.

2. An apparatus, as set forth in claim 1, wherein said means for producing a transient signal produces an audible signal.

3. An apparatus, as set forth in claim 1, wherein each of said sensor signals has an associated pin number and said means for producing a recorded diagnostic signal indicates the pin number associated with each of said sensor signals having changed from said normal state to said fault condition or from said fault condition to said normal state.

4. An apparatus for indicating a changed condition in a diagnostic system, comprising:
   an audio warning means for producing an audible signal;
   a plurality of sensor means for sensing a plurality of parameters and responsively producing a plurality of sensor signals, each of said sensor signals indicating one of a plurality of states; and
   signalling means for causing said audio warning means to produce said audible signal in response to one of said sensor signals changing states.

5. An apparatus, as set forth in claim 4, including:
   a plurality of sensor inputs being connected to said plurality of sensor means and each having an associated pin number; and
   a means for displaying each pin number being associated with a sensor signal having changed states.

6. An apparatus, for indicating a changed condition in a diagnostic system, comprising:
   an audio warning means for producing an audible signal;
   a plurality of sensor means for sensing a plurality of parameters and responsively producing a plurality of sensor signals, each of said sensor signals indicating one of a plurality of states;
   signalling means for causing said audio warning means to produce said audible signal in response to one of said sensor signals changing states;
   a plurality of sensor inputs being connected to said plurality of sensor means;
   means for indicating a plurality of present or previous fault conditions on said sensor inputs; and
   service means for isolating one of said inputs having a present or previous fault condition and wherein said signalling means causes said audio warning means to produce said audible signal in response to only the isolated input changing from a fault condition to a normal state or from said normal state to said fault condition.

7. An apparatus, as set forth in claim 6, wherein each of said plurality of sensor inputs has an associated pin number and including a means for indicating each pin number associated with a sensor signal having changed states.

8. An apparatus for indicating a changed condition in a diagnostic system, comprising:
   a plurality of sensor means for sensing a plurality of parameters and responsively producing a plurality of sensor signals, each of said sensor signals being in one of a normal state or a fault condition and having an associated pin number;
   means for receiving each of said sensor signals and responsively determining whether one or more of said sensor signals have changed from said normal state to said fault condition or from said fault condition to said normal state; and
   display means for indicating each pin number associated with a sensor signal having changed from said normal state to said fault condition or from said fault condition to said normal state.

9. An apparatus, as set forth in claim 8, including means for displaying each pin number being associated with a sensor signal having a present or previous fault condition.

10. An apparatus, as set forth in claim 9, including service means for isolating one of said pin numbers being associated with a sensor signal having a present or previous fault condition.

11. An apparatus, as set forth in claim 10, including means for displaying said pin number being isolated by said service means and a fault coding.

12. An apparatus, as set forth in claim 11, wherein said fault coding includes a module identifier, a component identifier, a fault mode identifier, and a means for indicating that a fault condition presently exists with respsect to the sensor signal associated with the isolated pin number.

13. An apparatus for indicating a changed condition, comprising:
   display means for indicating the level of a plurality of parameters and the presence of one or more of a plurality of fault or warning conditions, said display means being operable in a normal display mode and a diagnostic mode;
   an audio warning means for producing an audible signal;
   sensor means for sensing a plurality of conditions and responsively producing a plurality of sensor signals each indicating one of a fault condition and a normal state; and
   signalling means for causing said audio warning means to produce said audible signal in response to one or more of said sensor signals indicating a warning condition and said display means being in said normal display mode and in response to one or more of said plurality of sensor signals changing from said fault condition to said normal state or from said normal state to said fault condition and said display means being in said diagnostic mode.

14. An apparatus, as set forth in claim 13, including a plurality of sensor inputs being connected to said plurality of sensor means and each having an associated pin number and a means for displaying, in response to said display means being in said diagnostic mode, the pin number of each sensor signal having changed states.

15. An apparatus, as set forth in claim 14, including means for displaying each pin number being associated with a sensor signal having a present or previous fault condition.

16. An apparatus, as set forth in claim 14, including:
means for indicating a plurality of pin numbers being associated with present or previous fault conditions in response to said display means being in said diagnostic mode; and
service means for isolating one of said plurality of pin numbers being associated with a present or previous fault condition and wherein said signalling means causes said audio warning means to produce said audible signal in response to only an isolated input changing from said fault condition to said normal state or from said normal state to said fault condition.

17. An apparatus for indicating a changed condition, comprising:
display means for indicating the level of a plurality of parameters and the presence of one or more fault or warning conditions, said display means being operable in a normal display mode and a diagnostic mode;
a plurality of sensor means for sensing a plurality of parameters and responsively producing a plurality of sensor signals, each of said sensor signals being in one of a normal state or a fault condition and having an associated pin number; and
signalling means for causing said display means to indicate said level of said plurality of sensed parameters in response to said display means being in said normal display mode and to indicate, in response to said display means being in said diagnostic mode, each pin number being associated with a sensor signal having changed from said fault condition to said normal state or from said normal sate to said fault condition.

18. An apparatus, as set forth in claim 17, wherein:
said display means includes a gauge means for displaying the level of a sensed parameter and a scaling digit means for indicating the scale of said gauge means; and
said signalling means causes said scaling digit means to display a number being indicative of the scale of said gauge means in response to said display means being in said normal display mode and to display, in response to said display means being in said diagnostic mode, each of said pin numbers being associated with a sensor signal having changed from said fault condition to said normal state or from said normal state to said fault condition.

19. An apparatus, as set forth in claim 17, including means for indicating each pin number being associated with a sensor signal having a present or previous fault condition in response to said display means being in said diagnostic mode.

20. An apparatus, as set forth in claim 19, including service means for isolating one of said pin numbers being associated with a sensor signal having a present or previous fault condition.

21. An apparatus, as set forth in claim 20, including means for displaying a fault code corresponding to the present or previous fault condition of the isolated pin number.

22. An apparatus, as set forth in claim 21, wherein said fault code includes a module identifier, a component identifier, a fault mode identifier, and a means for indicating that a fault condition currently exists with respsect to the sensor signal associated with said pin number being isolated by said service means.

23. An apparatus for indicating a changed condition, comprising:
display means for indicating the level of a plurality of parameters and the presence of one or more fault or warning conditions, said display means being operable in a normal display mode and a diagnostic mode;
an audio warning means for producing an audible signal;
a plurality of sensor means for sensing a plurality of parameters and responsively producing a plurality of sensor signals, each of said sensor signals being in one of a normal state or a fault condition and having an associated pin number; and
signalling means for causing said audio warning means to produce said audible signal in response to one or more of said sensor signals changing from said fault condition to said normal state or from said normal state to said fault condition and said display means being in said diagnostic mode and for causing said display means to indicate said level of said plurality of sensed parameters in response to said display means being in said normal display mode and, in response to said display means being in said diagnostic mode, to indicate each pin number being associated with a sensor signal having changed from said fault condition to said normal state or from said normal state to said fault condition.

24. An apparatus, as set forth in claim 23, wherein:
said display means includes a gauge means for displaying the level of a sensed parameter and a first scaling digit means for indicating the scale of said gauge means; and
said signalling means causes said first scaling digit means to display a number being indicative of the scale of said gauge means in response to said display means being in said normal display mode and to display, in response to said display means being in said diagnostic mode, each of said pin numbers being associated with a sensor signal changing from said fault condition to said normal state or from said normal state to said fault condition.

25. An apparatus, as set forth in claim 24, including a second scaling digit means for indicating the scale of said gauge means and wherein said signalling means causes said second scaling digit means to display a number being indicative of the scale of said gauge means in response to said display means being in said normal display mode and to display each pin number being associated with a sensor signal having a present or previous fault condition in response to said display means being in said diagnostic mode.

26. An apparatus, as set forth in claim 23, including means for displaying each pin number being associated with a sensor signal having a present or previous fault condition.

27. An apparatus, as set forth in claim 26, including service means for isolating one of said pin numbers being associated with a sensor signal having a present or previous fault condition.

28. An apparatus, as set forth in claim 27, wherein said audio warning means produces said audible signal in response to only the sensor signal being associated with the isolated pin number changing from said normal state to said fault condition or from said fault condition to said normal state.

29. An apparatus, as set forth in claim 23, wherein said signalling means causes said audio warning means to produce said audible signal in response to a sensed parameter being in a warning condition and said display means being in said normal display mode.

30. A method for indicating a changed condition in a diagnostic system, comprising the steps of:
sensing a plurality of parameters and responsively producing sensor signals, each of said sensor signals indicating one of a plurality of states, said plurality of states including one or more normal states and one or more fault conditions; and
producing an audible signal in response to one of said sensor signals changing from one of said fault conditions to one of said normal states or from one of said normal states to one of said fault conditions.

31. A method, as set forth in claim 30, including the step of displaying a pin number for each sensor signal having changed states.

32. A method, as set forth in claim 30, including the steps of indicating a plurality of present or previous fault conditions, isolating one of the inputs having a present or previous fault condition, and producing the audible signal in response to only the isolated input changing from said fault condition to said normal condition or from said normal condition to said fault condition.

33. A method, as set forth in claim 32, including the step of displaying a pin number for each sensor signal having changed states.

34. A method for indicating a changed condition in a diagnostic system, comprising the steps of:
sensing a plurality of parameters and responsively producing sensor signals, each of said sensor signals being in one of a normal state or a fault condition and having an associated pin number;
determining whether one or more of said sensor signals have changed from the normal state to the fault condition or from the fault condition to the normal state; and
displaying each of the pin numbers being associated with a sensor signal having changed from the normal state to the fault condition or from the fault condition to the normal state.

35. A method, as set forth in claim 34, including the step of displaying each pin number being associated with a sensor signal having a present or previous fault condition.

36. A method, as set forth in claim 35, including the step of isolating one of the pin numbers being associated with a sensor signal having a present or previous fault condition.

37. A method, as set forth in claim 36, including the step of displaying the isolated pin number and a fault code.

38. A method, as set forth in claim 37, wherein said fault code includes a module identifier, a component identifier, a fault mode identifier, and a means for indicating that a fault condition currently exists with respect to the sensor signal associated with the isolated pin number.

39. A method for indicating a changed condition, comprising the steps of:
indicating the level of a plurality of parameters and the presence of one or more fault or warning conditions in a normal display mode;
producing a plurality of sensor signals, each of the sensor signals being in one of a normal state or a fault condition and having an associated pin number;
producing an audible signal in response to one of the sensor signals changing from the fault condition to the normal state or from the normal state to the fault condition in a diagnostic mode; and
displaying the pin number associated with each sensor signal changing from the fault condition to the normal state or from the normal state to the fault condition in the diagnostic mode.

40. A method, as set forth in claim 39, including the steps of:
displaying the level of one of the parameters on a gauge;
displaying a first scaling digit for indicating the scale of the gauge in the normal display mode; and
displaying in place of the first scaling digit the pin number associated with each sensor signal changing from the fault condition to the normal state or from the normal state to the fault condition while in the diagnostic mode.

41. A method, as set forth in claim 40, including the steps of:
displaying a second scaling digit for indicating the scale of the gauge in the normal display mode; and
displaying in place of the second scaling digit each pin number associated with a sensor signal having a present or previous fault condition.

42. A method, as set forth in claim 39, including the steps of displaying each pin number associated with a sensor signal having a present or previous fault condition and isolating one of the pin numbers being associated with a sensor signal having a present or previous fault condition.

43. A method, as set forth in claim 42, wherein the audible signal is produced in response to only the sensor signal being associated with the isolated pin number changing from said normal state to said fault condition or from said fault condition to said normal state.

44. A method, as set forth in claim 39, including the step of producing an audible signal in response to a sensed parameter being in a warning condition in the normal display mode.

* * * * *